United States Patent
Masters (10) Patent No.: US 10,578,160 B2
(45) Date of Patent: Mar. 3, 2020

(54) GEAR PUMP BEARING

(71) Applicant: ROLLS-ROYCE PLC, London, Greater London (GB)

(72) Inventor: Jonathan Masters, Birmingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/035,866

(22) Filed: Jul. 16, 2018

(65) Prior Publication Data

US 2019/0078619 A1 Mar. 14, 2019

(30) Foreign Application Priority Data

Sep. 11, 2017 (GB) ...................................... 1714578

(51) Int. Cl.
| | |
|---|---|
| *F16C 33/12* | (2006.01) |
| *F01C 21/02* | (2006.01) |
| *F16C 17/10* | (2006.01) |
| *F16C 32/06* | (2006.01) |
| *F16C 33/10* | (2006.01) |
| *F16C 33/14* | (2006.01) |

(Continued)

(52) U.S. Cl.
CPC ............ *F16C 33/121* (2013.01); *F01C 21/02* (2013.01); *F01D 25/166* (2013.01); *F04C 2/18* (2013.01); *F16C 17/10* (2013.01); *F16C 32/0651* (2013.01); *F16C 33/10* (2013.01); *F16C 33/1045* (2013.01); *F16C 33/1065* (2013.01); *F16C 33/1085* (2013.01); *F16C 33/125* (2013.01); *F16C 33/14* (2013.01); *F04C 2240/56* (2013.01); *F16C 17/22* (2013.01); *F16C 2204/12* (2013.01);
(Continued)

(58) Field of Classification Search
CPC ...... F16C 33/121; F16C 33/10; F16C 33/125; F16C 2204/12; F16C 2204/32; F16C 2204/34; F16C 2223/42; F01D 25/166
See application file for complete search history.

(56) References Cited

U.S. PATENT DOCUMENTS 2,887,766 A * 5/1959 Fike .................... C23C 24/08
205/181
3,937,602 A 2/1976 Sharples
(Continued)

FOREIGN PATENT DOCUMENTS

| | | |
|---|---|---|
| DE | 938 451 C | 3/1956 |
| EP | 2463536 A1 | 6/2012 |

(Continued)

OTHER PUBLICATIONS

Apr. 15, 2019 Office Action issued in European Patent Application No. 18 186 905.8.

*Primary Examiner* — Thomas R Hannon
(74) *Attorney, Agent, or Firm* — Oliff PLC (57) ABSTRACT

A gear pump bearing block has a bush formed of antifriction alloys. The bush has a cylindrical portion providing a bore adapted to receive a bearing shaft of a gear of the pump. It further has a thrust face at the end of the cylindrical portion, the thrust face being adapted to slidingly engage with a side surface of the gear. The bush has an inner component providing the bore, and an outer component forming a radially outer surface of the cylindrical portion. The inner and outer components are formed of respective lead bronze alloys, the lead bronze alloy of the outer component having a higher lead content than the lead bronze alloy of the inner component.

15 Claims, 5 Drawing Sheets

(51) Int. Cl.
*F04C 2/18* (2006.01)
*F01D 25/16* (2006.01)
*F16C 17/22* (2006.01)

(52) U.S. Cl.
CPC ...... *F16C 2204/32* (2013.01); *F16C 2204/34* (2013.01); *F16C 2220/60* (2013.01); *F16C 2223/42* (2013.01); *F16C 2226/14* (2013.01); *F16C 2360/23* (2013.01); *F16C 2360/42* (2013.01)

(56) References Cited

U.S. PATENT DOCUMENTS

| | | |
|---|---|---|
| 4,523,365 A | 6/1985 | Richmond |
| 5,041,339 A | 8/1991 | Mori et al. |
| 6,103,089 A * | 8/2000 | Staschko ............... C25D 3/56 106/1.25 |
| 8,845,199 B2 * | 9/2014 | Haedicke ............ F16C 33/122 384/294 |
| 2005/0232784 A1 | 10/2005 | Yates et al. |
| 2011/0142381 A1 | 6/2011 | Zidar |
| 2016/0208611 A1 | 7/2016 | Veilleux, Jr. et al. |

FOREIGN PATENT DOCUMENTS

| | | |
|---|---|---|
| GB | 1058276 A | 2/1967 |
| GB | 2 034 821 A | 6/1980 |
| GB | 2263950 A | 8/1993 |
| GB | 2285060 A | 6/1995 |
| JP | S57-120727 A | 7/1982 |
| WO | 99/13224 A1 | 3/1999 |

* cited by examiner

GEAR PUMP BEARING

FIELD OF THE PRESENT DISCLOSURE

The present disclosure relates to gear pump bearings. In particular, but not exclusively, the disclosure relates to improvements in gear pump bearings for use in aero-engine fuel supply systems.

BACKGROUND

In a gas turbine engine fuel delivery system, pump assemblies, as shown for example in US 2005/0232784, are typically used for pumping the fuel. Where such assemblies include gear pump, gear elements are commonly supported by bearing blocks which are adapted to receive respective bearing shafts of the gears through a bore of each bearing block. These bearing blocks also typically abut axially-directed faces of respective gears of the pumps. The bearing blocks may be for solid bearings, or pressure loaded bearings. A solid bearing typically transfers load from journals to the pump housing, and additionally can transfer axial load to the housing. Pressure loaded bearings also transfer load from journals to housing, and in addition can provide an axial force and a moment against the axially-directed face of the gear which the bearing block abuts.

It is known to use bimetallic (alloy) bearing blocks, as shown, for example, in U.S. Pat. No. 4,523,365. Such a bimetallic bearing block generally comprises an inner bush covered with an outer backing layer. The inner bush is formed of an alloy which provides a tribologically compatible surface for the gear side face and journal to run against. However it may be undesirable for the whole bearing block to be formed of such an alloy. Two reasons for this are that firstly the weight of a block formed solely of such an alloy may be larger than desired, and secondly the difference between the coefficient of thermal expansion (CTE) and that of the light alloy normally used for the pump housing body may be large. Therefore, in a bimetallic bearing block the inner bush is coated with a light alloy backing layer, which reduces the overall weight of the block, and mitigates the CTE difference with the pump housing body.

In order to provide a tribologically compatible surface for the gear side face and journal to run against, an antifriction alloy is typically used to form the inner bush. The antifriction alloy may be, for example, a lead bronze alloy. In particular, the antifriction alloy may be a high concentration lead bronze alloy.

However, testing of bearing blocks which use such an antifriction alloy has shown that such blocks can be prone to suffer permanent radial deformation along the bearing bore when operated above a threshold pressure/temperature combination. If this permanent radial deformation is significant, it can reduce the clearance between the gear journal and the bearing bore. As a result of this reduced clearance, overheating can occur, which may result in mechanical damage of the gear and/or bearing. This problem is more evident in bearing blocks having a higher concentration of lead than those having a lower concentration.

Figure 1:
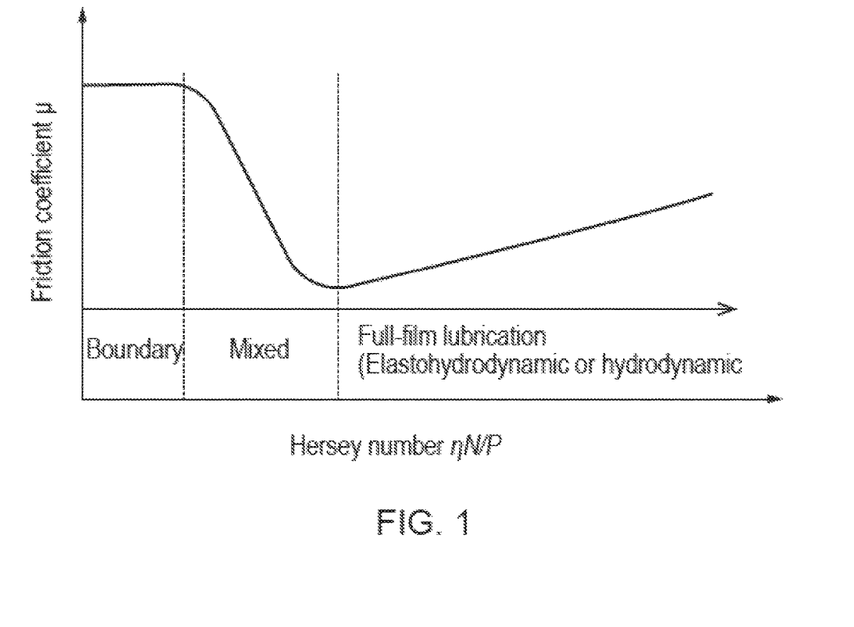
FIG. 1 shows a typical Stribeck curve.

FIG. 1 shows a typical Stribeck curve, which describes how coefficient of friction varies for different lubrication regimes. It can be seen that typically, higher coefficients of friction occur in a mixed mode lubrication regime as compared to in a full-film lubrication regime. The thrust faces in a gear pump bearing arrangement typically operate at least partly in a mixed-film lubrication regime. This is evident from the wear and scoring that can be visualised at the thrust surfaces after running. In contrast, the journal element of the bearing typically operates in a full-film lubrication regime. Generally, the loads on the thrust face of a bearing block are lower than those acting on the journal element of the bearing, but the sliding velocities are higher. Accordingly, local heating of the thrust face and gear side face is more likely than in the journal element of the bearing. The situation may be particularly acute at the region of the thrust face under the gear root circle diameter where fluid cooling is limited by the restricted fluid flow that occurs across this section of the thrust face. The primary mode for heat transfer away from the thrust face at this point may be conduction through the inner bush and backing layer of the bearing block. Therefore, depending on the thermal conductivity of the alloys of these components, there may be a problem that heat cannot transfer away from the thrust face sufficiently quickly. This may then lead to reduced wear characteristics, and correspondingly poorer performance of the thrust face in a thrust bearing capacity.

SUMMARY

Accordingly, in a first aspect, the present disclosure provides a gear pump bearing block having:
- a bush formed of antifriction alloys, the bush having a cylindrical portion providing a bore adapted to receive a bearing shaft of a gear of the pump, and further having a thrust face at the end of the cylindrical portion, the thrust face being adapted to slidingly engage with a side surface of the gear;
- wherein the bush has an inner component providing the bore, and an outer component forming a radially outer surface of the cylindrical portion; and
- wherein the inner and outer components are formed of respective lead bronze alloys, the lead bronze alloy of the outer component having a higher lead content than the lead bronze alloy of the inner component.

Lead-bronze alloys which have a lower lead content tend to have a higher yield stress and tend to suffer less permanent deformation in use than lead bronze alloys with a higher lead content. Thus by forming the bush in this way, the inner component can provide a higher yield capability where loads are highest, while the outer component can enhance the lubricating properties of the pumped fluid through its higher lead content.

In a second aspect, the present disclosure provides a method of manufacturing the gear pump bearing block of the first aspect, the method including:
- providing the inner and outer components as separate items; and
- interference fitting the inner component to the outer component.

Conveniently, the interference fitting can be performed by expansion fitting the inner component inside the outer component, or shrink fitting the outer component around the outer component to form the bush.

After the interference fitting, the method may include: machining or finish-machining the bore of the bush.

In a third aspect, the present disclosure provides gear pump having one or more gears with bearing shafts supported by respective gear pump bearing blocks of the first aspect.

In a fourth aspect, the present disclosure provides a fuel supply system of a gas turbine engine having the gear pump according to the third aspect for pumping fuel.

In a fifth aspect, the present disclosure provides a gas turbine engine having the fuel supply system of the fourth aspect.

Optional features of the present disclosure will now be set out. These are applicable singly or in any combination with any suitable aspect of the present disclosure.

The outer component can form a radially outer portion of the thrust face thereby providing a contact area for the fluid with the higher lead content alloy. This contact area can then enhance the lubricating properties of the pumped fluid.

The lead bronze alloy of the outer component may have a lead concentration of at least 25 wt %. For example it may have a lead concentration in the range from 25-35 wt %, such as about 30 wt %.

The lead bronze alloy of the inner component may have a lead concentration of up to 25 wt %. For example it may have a lead concentration in the range from 15-25 wt %, such as about 20 wt %.

Advantageously, e.g. when interference fitting is used to fit the inner component to the outer component, the relative radial thicknesses of the inner and outer component can be selected so as to induce residual compressive stress in the inner component, thereby improving the yield capability (i.e. stress range to yield) of the surface of the bore. For example, the radial thickness of the inner component can be less than that of the outer component.

The gear pump bearing block may further have: an annular gallery contained in the cylindrical portion between the inner and outer components such that the gallery is spaced from the surface of the bore and from the thrust face, the gallery surrounding the bore; a recess in the surface of the bore which forms, in use, a hydrostatic pad for the supply of fluid to the interface between the bore surface and the bearing shaft; and an inlet to the annular gallery formed at the thrust face and an outlet from the annular gallery formed in the recess such that, in use, fluid flows from the inlet, through the annular gallery and then to the outlet. The gallery can enhance the lubricating properties of the pumped fluid by providing increased contact area for the fluid with the high lead content alloy. Also the gallery can improve heat transfer away from the thrust face of the bearing block. In this way the load carrying capacity of the thrust face may be improved.

Conveniently, the inner component may be spool-shaped having projecting end portions and a recessed central portion, and the outer component may have cylindrical bore into which the inner component is fitted. In this way, the end portions of the spool can interface to the outer component and the recessed central portion can be spaced from the outer component to form the annular gallery.

The bearing block may further have a bearing bridge insert at the thrust face partitioning high pressure and low pressure sides of the gear and providing locally increased cavitation erosion resistance. The inlet to the annular gallery can then be formed on the high pressure side of the bearing bridge insert.

The bush may further have a flange portion extending radially outwardly at the end of the cylindrical portion to provide the thrust face. In this case, the bearing block may further have a backing layer covering a radially outer surface of the cylindrical portion and a rear face of the flange portion, the backing layer being formed of relatively less dense alloy compared to the antifriction alloys. Conveniently, the outer component may form the rear face of the flange portion. The method of manufacture of the bearing block may include: covering the radially outer surface of the cylindrical portion and the rear face of the flange portion with the backing layer. For example, the covering may be performed by thermally-spraying the relatively less dense alloy onto the bush.

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES

Although a gear pump bearing block, gear pump and fuel delivery system of the present disclosure may be used in various applications, a significant intended use is in an aircraft fuel supply system, and the disclosure focuses hereafter on such a system.

Figure 2:
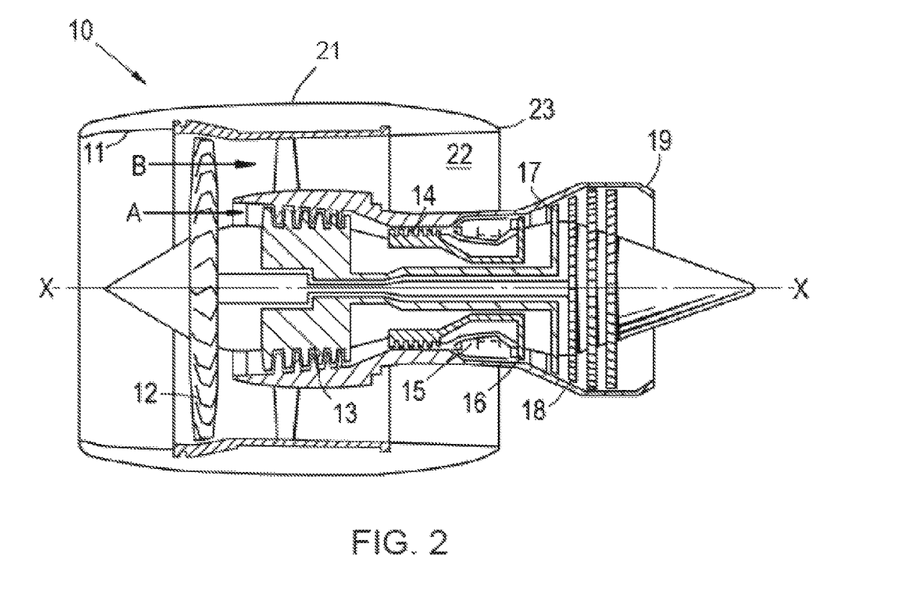
FIG. 2 shows a longitudinal cross-section through a ducted fan gas turbine engine.

With reference to FIG. 2, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 3:
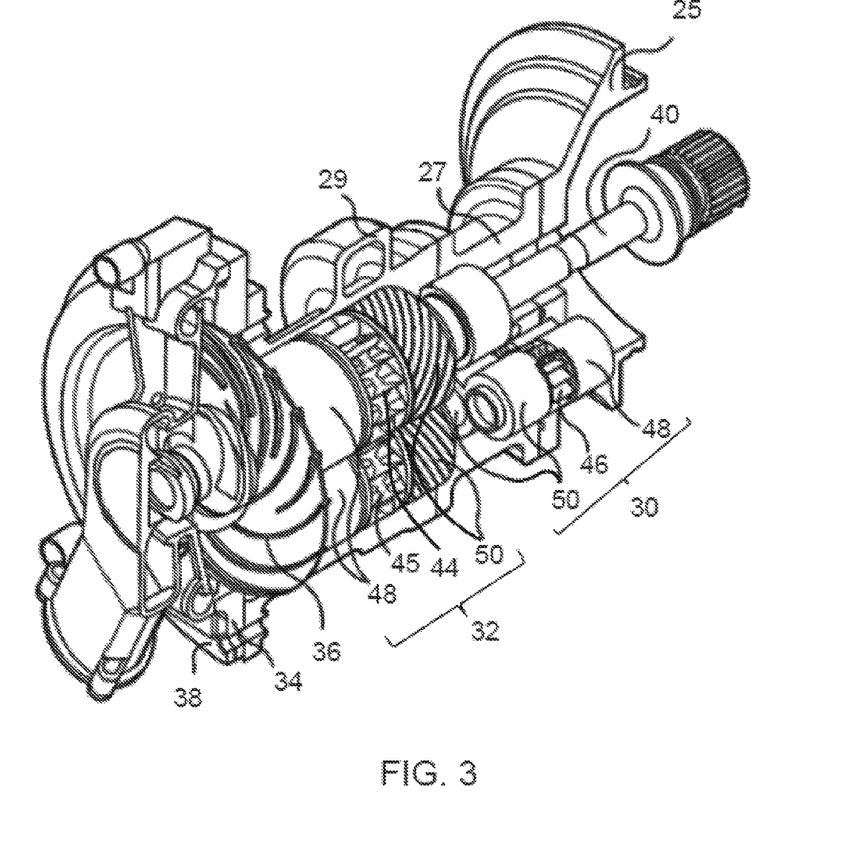
FIG. 3 shows a cut away perspective view of the interior of a pump assembly of the engine.
Figure 4:
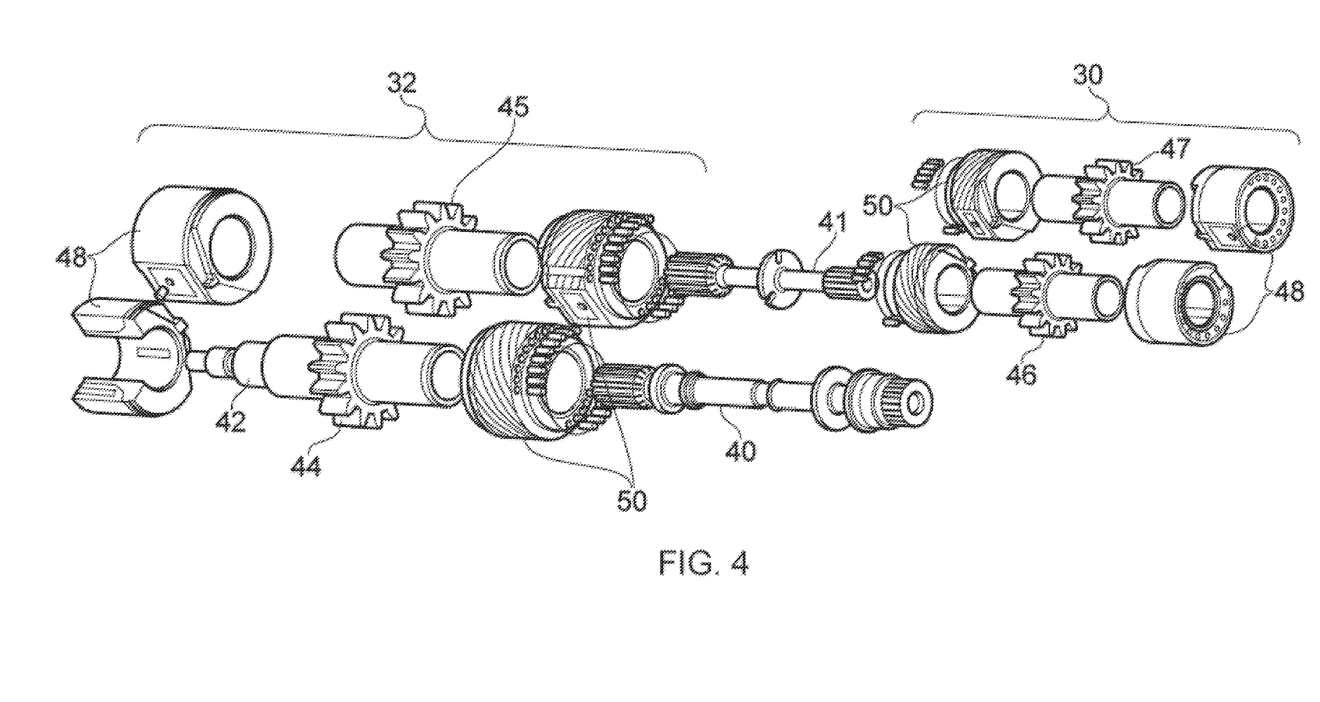
FIG. 4 shows an exploded perspective view of some components of the pump assembly.

FIG. 3 shows a cut away perspective view of the interior of a dual stage pump assembly of a fuel supply system of the engine 10, and FIG. 4 shows an exploded perspective view of displacement gear components of the assembly of FIG. 3. The pump assembly has in sequence: an outer casing comprising a mounting flange 25; a housing 27 for a smaller primary displacement gear pump 30; a housing 29 for a larger secondary displacement gear pump 32; a centrifugal stage back plate 34 which acts as an end cover for the housing 29 and additionally as a back plate for a centrifugal pump 36; and finally at the end of the casing remote from the mounting flange 25 a low pressure stage housing 38 for the centrifugal pump 36, this housing including the centrifugal pump inlet. The centrifugal pump forms the low pressure stage of the dual stage pump assembly, and the two gear pumps form the high pressure stage of the assembly. Typically, the small primary displacement pump 30 is pressurised at all flight conditions, while the large secondary displacement pump 32 is pressurised for high power (above cruise) conditions, and for low speed starting.

A drive shaft 40 which accepts power from an engine accessory gearbox (not shown) has male spline couplings at each end. The drive shaft 40 accommodates for misalignment and connects directly into a driver gear 44 of the secondary gear pump 32, and continues via a linking drive shaft 42 to the impeller and inducer of the centrifugal pump 36. A secondary drive shaft 41 transfers power from the secondary pump to the primary pump 30 and also accommodates for misalignment. More particularly, one splined end of the secondary drive shaft is engaged internally with the driven gear 45 of the larger, secondary displacement pump, whilst its opposite splined end is engaged internally with the driver gear 46 of the smaller, primary gear pump, which drives the driven gear 47 of the primary gear pump.

Each displacement pump gear 44-47 has a respective solid bearing block 48 and a respective pressure-loaded bearing block 50 which are adapted to receive a bearing shaft or journal of that gear. The bearing blocks are shown in greater detail in FIG. 5 and FIG. 6.

Figure 5:
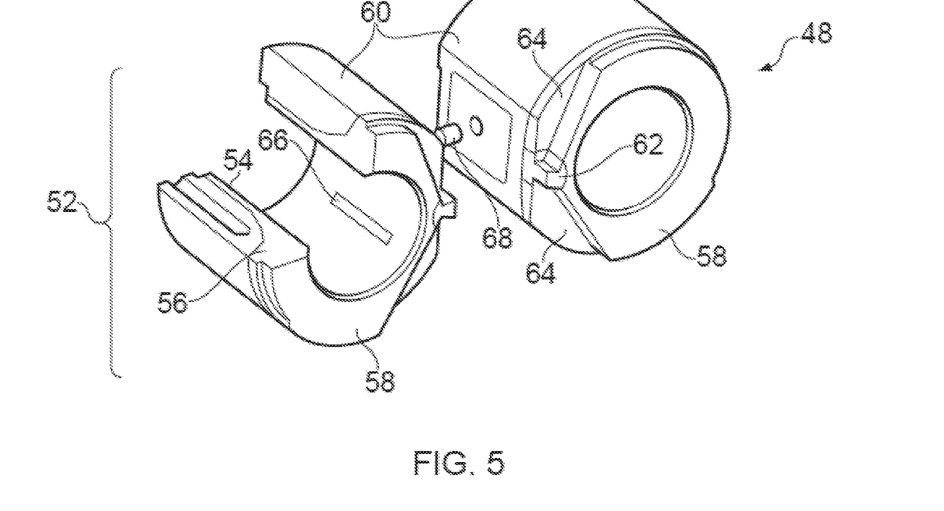
FIG. 5 shows a perspective view of a solid bearing block set.

FIG. 5 shows a perspective view of two of the solid bearing blocks 48 which form a solid bearing set. The solid bearings transfer load from their gear journals to the outer casing, and also transfer axial thrust load to the casing. Each bearing block of the set has a bush 52 formed of lead bronze antifriction alloys, the bush having a cylindrical portion 54 providing a bore adapted to receive the bearing shaft of the respective gear, and further having a flange portion 56 extending radially outwardly at an end of the cylindrical portion to provide a thrust face 58 adapted to slidingly engage with a side surface of the gear. Each block also has a backing layer 60 covering a radially outer surface of the cylindrical portion and a rear face of the flange portion, the backing layer being formed of relatively less dense alloy (e.g. aluminium alloy) compared to the antifriction alloys. The bore and thrust face may be e.g. lead-indium plated or coated with dry film lubricant to improve tribological compatibility.

Each solid bearing block 48 further has a bearing bridge 62 which seals high pressure fuel from low pressure fuel. The bearing bridge can be for example an aluminium bronze insert. In addition to providing sealing between high pressure fuel and low pressure fuel, the insert can help to resist cavitation erosion of the bearing blocks, as described in U.S. Pat. Nos. 6,716,010 and 7,607,906. Portions of the thrust face at opposite sides of the bearing bridge are set back so as to provide side ports 64 which allow fuel into and out of the meshing gears.

Each solid bearing block 48 also has a recess in the surface of the bore which forms, in use, a hydrostatic pad 66 for the supply of fluid to the interface between the bore surface and the bearing shaft. A dowel 68 between the bearing blocks engages with corresponding recesses in the sides of the block to limit relative movement of the blocks.

Figure 6:
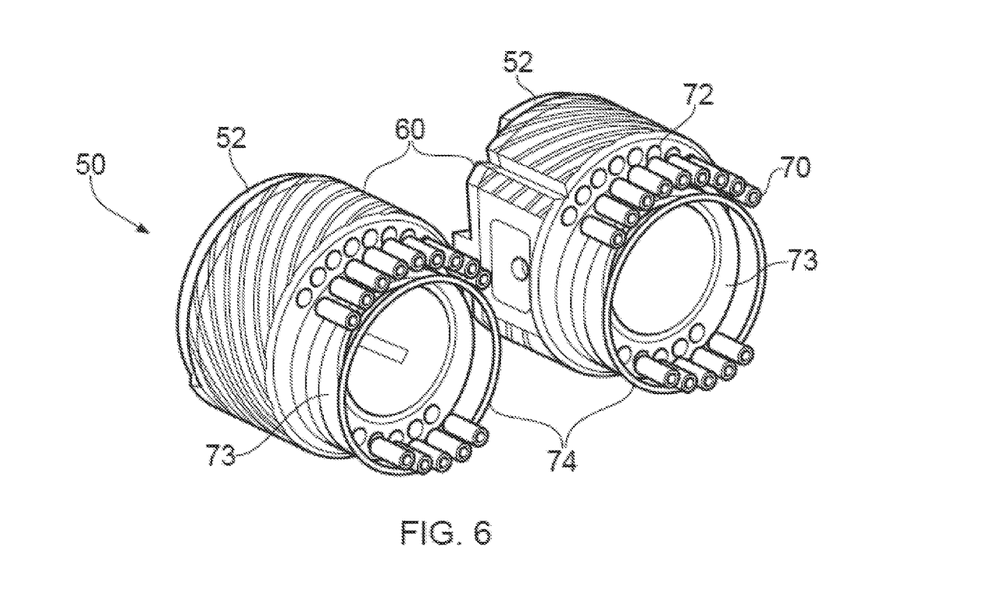
FIG. 6 shows a perspective view of a pressure loaded bearing block set.

FIG. 6 shows a perspective view of two of the pressure loaded bearing blocks 50 which form a pressure loaded bearing set. Similarly to the solid bearing blocks, each pressure loaded bearing block has a bush 52 formed of lead bronze antifriction alloys and covered with a backing layer 60. Like the solid bearing blocks, although not entirely visible in FIG. 6, each pressure loaded bearing block has a cylindrical portion, flange portion, bearing bridge, side ports and hydrostatic pad. Further, the two pressure loaded bearing blocks are fixed together with a dowel and recess arrangement.

Springs 70 are set into respective recesses 72 on the rear of each pressure loaded bearing block 50. These springs provide mechanical load which can increase the force of engagement between the bearing thrust faces and respective side surfaces of the gears. 'O' ring seals 74 are provided at the rear of the bearing blocks to seal high pressure from low pressure. Each seal is carried by an offset nose 73 of the block, with the spring recesses at one side of the block being formed in the nose and the spring recesses at the other side of the block being formed outside the nose. This arrangement determines the hydraulic load and moment forcing the bearings against the sides of the gears.

Under extreme loads the bores in the bearing blocks can experience reductions in diameter, the greatest reductions occurring close to the thrust faces of the bearing blocks, where the complete diameter of each bearing block is formed of lead bronze due to a flange portion of the bush. Such excessive deformation results in the clearance between the gear journal and the bearing bore being reduced, which can correspondingly lead to overheating and eventually damage of the gear journal and/or the bearing block.

Figure 7A:
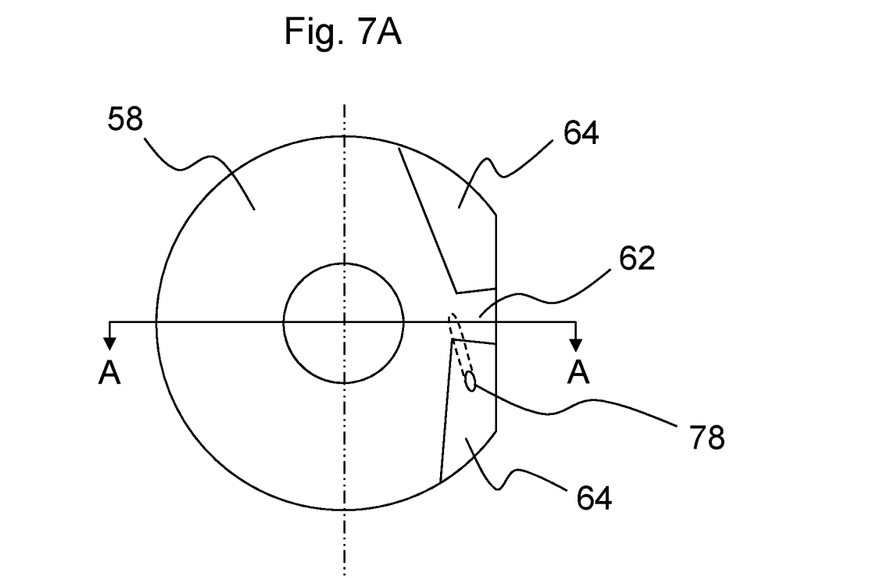
FIG. 7A shows a plan view of the thrust face of a bearing block from the solid bearing block set.
Figure 7B:
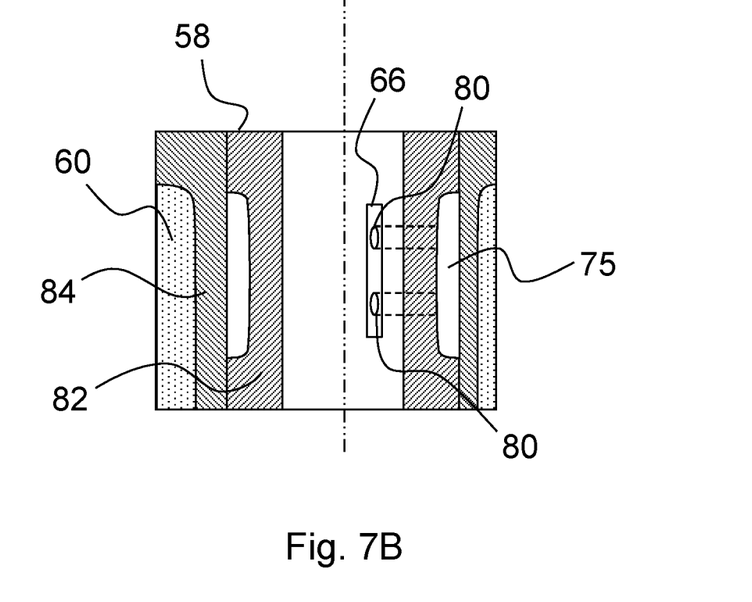
FIG. 7B shows a longitudinal cross section on a plane A-A through the block.

FIG. 7A shows a plan view of the thrust face 58 of one of the solid bearing blocks 48 and FIG. 7B shows a longitudinal cross section on a plane A-A through the block. The block has features to reduce or eliminate such deformation of the bearing bore. Similar features can also be incorporated in the pressure-loaded bearing blocks 50.

In particular, the bush 52 has an inner component 82 providing the bore, and an outer component 84 forming the radially outer surface of the cylindrical portion 54 and the rear face of the flange portion 56. With such an arrangement, the inner component can form a radially inner portion of the thrust face 58, and the outer component can form a radially outer portion of the thrust face. The two components are formed of respective lead bronze alloys, with the lead bronze alloy of the outer component having a higher lead content than the lead bronze alloy of the inner component. For example, the higher lead content alloy can have a lead concentration of at least 25 wt % (e.g. in the range from 25-35 wt %), and the lower lead content alloy can have a lead concentration of up to 25 wt % (e.g. in the range from 15-25 wt %). Lead concentrations of about 30 wt % for the higher lead content alloy, and about 20 wt % for the higher lead content alloy may be suitable.

Lead-bronze alloys which have a lower lead content, e.g. 20 wt % lead bronze, have a higher yield stress and tend to suffer less permanent deformation in use than lead bronze alloys with a higher lead content, e.g. 30 wt % lead bronze. However, bearings made of 20 wt % lead bronze have also been shown to have poorer performance as thrust bearings than those manufactured from 30 wt % lead-bronze, and suffer a problem of poor load carrying capacity at the thrust face of the bearing block. One reason for this poorer performance may be due to the relationship between thermal conductivity of the material and the wear properties of the material.

However, by using alloys with two different lead concentrations for the inner 82 and outer 84 components more optimal bush performance can be obtained than would be the case if the bush 52 were formed of a single lead bronze alloy. Thus the outer component has a high lead content, promoting the leaching of its lead into the fuel (e.g. at the thrust face 58) to improve lubrication during hot operating conditions. The inner component, by contrast, has a lower lead content and so has a higher yield strength than the outer component. This reduces the risk of particularly thrust face deformation.

As shown in FIG. 7B, an annular gallery 75 can be contained in the cylindrical portion 54 between the inner 82 and outer 84 components such that the gallery is spaced from the surface of the bore and from the thrust face 58. One way of providing the galley is to provide a spool-shaped inner component, whereby the ends of the "spool" contact the inner surface of the outer component to form a fluid cavity around the circumference of the inner component. The gallery has parallel outlets 80 (to reduce pressure losses) which supply fuel from the gallery to the hydrostatic pad 66 and thence to the interface between the bore surface and the bearing shaft. An inlet 78 to feed the gallery with fuel is taken from the high pressure side port 64, drilled at an angle.

The gallery 75 promotes intimate contact of the fuel supplied by the hydrostatic pad 66 with the higher lead content alloy of the outer component 84. In this way, the amount of leached lead in the supplied fuel can be increased, improving its lubricity.

The alloy of the inner component 82 has a lower lead content and so has a higher yield strength than that of the outer component 84. This reduces the risk of thrust face deformation. Moreover, the spool-shape of the inner component preserves contact regions with the outer component at the ends of the bush 52. When there is some bearing deformation, the main load paths between the gear journal and the bore surface are at these ends, and thus the spool-shape provides enhanced strength and stiffness at these regions.

In addition, the main radial heat transfer paths through the bush 52 are via these contact regions. Since most heat generation between the gear journal and the bore surface is at the end of the bush near the thrust face 58, effective heat transfer may not be significantly impeded by the annular gallery 75.

Another benefit of the gallery 75 is that it can help to transfer heat away from the thrust face 58. By increasing the heat transfer away from the thrust face, the load carrying capacity of the thrust face may be correspondingly improved. This can allow materials with increased strength but less inherent load capability to be used, such as the lower lead content alloy of the inner component 82.

The inner 82 and outer 84 components can be interference fitted together to form the bush 52. This can be a purely mechanical operation. Another option for the interference fitting, however, is to expansion fit the inner component inside the outer component, or to shrink fit the outer component around the outer component. In general, the bore can be post-machined since there is likely to be some distortion after the interference fitting operation. Advantageously, an interference fit can promote a high heat transfer coefficient across the interface between the inner and outer components.

The backing layer 60 can be manufactured e.g. by thermally-spraying aluminium alloy onto the bush 52 and then machining to final shape (as described in U.S. Pat. No. 4,523,365).

As an alternative to interference fitting, the contact surfaces of the inner 82 and outer 84 components can be suitably roughened (e.g. knurled) and an adhesive used to join the two together across the roughened surfaces. The roughening provides a key-way to increase the shear capability of the joint. However, the adhesive may compromise the heat transfer coefficient across the interface between the inner and outer components.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A gear pump bearing block having:
   a bush formed of antifriction alloys, the bush having a cylindrical portion providing a bore adapted to receive a bearing shaft of a gear of the pump, and further a thrust face at the end of the cylindrical portion, the thrust face being adapted to slidingly engage with a side surface of the gear;
   wherein the bush has an inner component providing the bore, and an outer component forming a radially outer surface of the cylindrical portion; and
   wherein the inner and outer components are formed of respective lead bronze alloys, the lead bronze alloy of the outer component having a higher lead content than the lead bronze alloy of the inner component.

2. A gear pump bearing block according to claim 1, wherein the outer component forms a radially outer portion of the thrust face.

3. A gear pump bearing block according to claim 1, wherein the lead bronze alloy of the outer component has a lead concentration of at least 25 wt %.

4. A gear pump bearing block according to claim 1, wherein the lead bronze alloy of the inner component has a lead concentration of up to 25 wt %.

5. A gear pump bearing block according to claim 1, further having an annular gallery contained in the cylindrical portion between the inner and outer components such that the gallery is spaced from the surface of the bore and from the thrust face, the gallery surrounding the bore;
   a recess in the surface of the bore which forms, in use, a hydrostatic pad for the supply of fluid to the interface between the bore surface and the bearing shaft; and
   an inlet to the annular gallery formed at the thrust face and an outlet from the annular gallery formed in the recess such that, in use, fluid flows from the inlet, through the annular gallery and then to the outlet.

6. A gear pump bearing block according to claim 5, further having a bearing bridge insert at the thrust face partitioning high pressure and low pressure sides of the gear and providing locally increased cavitation erosion resistance, the inlet to the annular gallery being formed on the high pressure side of the bearing bridge insert.

7. A gear pump bearing block according to claim 1, wherein:
- the bush further has a flange portion extending radially outwardly at the end of the cylindrical portion to provide the thrust face; and
- the bearing block further has a backing layer covering a radially outer surface of the cylindrical portion and a rear face of the flange portion, the backing layer being formed of relatively less dense alloy compared to the antifriction alloys.

8. A method of manufacturing the gear pump bearing block according to claim 1, the method including:
- providing the inner and outer components as separate items; and
- interference fitting the inner component to the outer component.

9. A method according to claim 8, wherein the interference fitting is performed by expansion fitting the inner component inside the outer component, or shrink fitting the outer component around the outer component to form the bush.

10. A method according to claim 8, further including, after the interference fitting:
- machining or finish-machining the bore of the bush.

11. A method according to claim 8, wherein the bush further has a flange portion extending radially outwardly at the end of the cylindrical portion to provide the thrust face, and the bearing block further has a backing layer covering a radially outer surface of the cylindrical portion and a rear face of the flange portion, the backing layer being formed of relatively less dense alloy compared to the antifriction alloys, and wherein the method further includes, after the interference fitting:
- covering the radially outer surface of the cylindrical portion and the rear face of the flange portion with the backing layer.

12. A method according to claim 11, wherein the covering of the radially outer surface of the cylindrical portion and the rear face of the flange portion with the backing layer is performed by thermally-spraying the relatively less dense alloy onto the bush.

13. A gear pump having one or more gears with bearing shafts supported by respective gear pump bearing blocks according to claim 1.

14. A fuel supply system of a gas turbine engine having the gear pump according to claim 13 for pumping fuel.

15. A gas turbine engine having the fuel supply system of claim 14.

\* \* \* \* \*